United States Patent
Ohira

(10) Patent No.: US 10,471,372 B2
(45) Date of Patent: Nov. 12, 2019

(54) ION EXCHANGER

(71) Applicant: TOYOTA BOSHOKU KABUSHIKI KAISHA, Aichi-ken (JP)

(72) Inventor: Junko Ohira, Kariya (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 61 days.

(21) Appl. No.: 15/788,894

(22) Filed: Oct. 20, 2017

(65) Prior Publication Data

US 2018/0117496 A1    May 3, 2018

(30) Foreign Application Priority Data

Oct. 27, 2016  (JP) .................................. 2016-210460
Sep. 11, 2017  (JP) .................................. 2017-173849

(51) Int. Cl.
| | | |
|---|---|---|
| *B01D 15/36* | (2006.01) | |
| *B01D 15/18* | (2006.01) | |
| *B01D 15/14* | (2006.01) | |
| *H01M 8/04044* | (2016.01) | |
| *B01J 47/12* | (2017.01) | |
| *H01M 8/04029* | (2016.01) | |
| *H01M 8/04007* | (2016.01) | |
| *B01J 47/024* | (2017.01) | |

(52) U.S. Cl.
CPC ........... *B01D 15/361* (2013.01); *B01D 15/14* (2013.01); *B01D 15/1885* (2013.01); *B01J 47/12* (2013.01); *H01M 8/04029* (2013.01); *H01M 8/04044* (2013.01); *H01M 8/04074* (2013.01); *B01J 47/024* (2013.01); *H01M 2250/20* (2013.01)

(58) Field of Classification Search
CPC ......... H01M 8/04074; H01M 8/04044; H01M 8/04029; H01M 2250/20; B01J 47/024; B01J 47/14; B01D 15/361; B01D 15/14; B01D 15/1885; B01D 15/22; B01D 27/144

See application file for complete search history.

(56) References Cited

U.S. PATENT DOCUMENTS 5,211,851 A * 5/1993 Meurer ................... C02F 1/003
                                                                210/232
2004/0237488 A1 * 12/2004 Stenersen .......... B01D 53/0407
                                                                55/482

(Continued)

FOREIGN PATENT DOCUMENTS

JP           4113715        7/2008

*Primary Examiner* — Terry K Cecil
(74) *Attorney, Agent, or Firm* — Greenblum & Bernstein, P.L.C.

(57) ABSTRACT

An ion exchanger includes a housing, which includes an inlet and an outlet for a coolant and is open upwardly, and a cartridge mounted within the housing so as to be removable upwardly out of the housing. The cartridge includes a first case and a second case respectively located above and below the inlet and the outlet and capable of containing an ion exchange resin. The first case includes a first flow entrance, which is in fluid communication with the inlet of the housing, and a first flow exit, which is in fluid communication with the outlet of the housing. The second case includes a second flow entrance in fluid communication with the inlet of the housing and a second flow exit in fluid communication with the outlet of the housing.

6 Claims, 12 Drawing Sheets

(56) References Cited

U.S. PATENT DOCUMENTS

| | | | |
|---|---|---|---|
| 2005/0274676 A1* | 12/2005 | Kumar | B01J 47/04 210/681 |
| 2009/0130529 A1* | 5/2009 | Yamamoto | H01M 8/04029 429/412 |
| 2013/0199986 A1* | 8/2013 | Miller | B01J 47/024 210/259 |
| 2016/0089618 A1* | 3/2016 | Ogura | B01D 15/361 210/282 |
| 2017/0187050 A1* | 6/2017 | Weissberger | H01M 8/04029 |

* cited by examiner

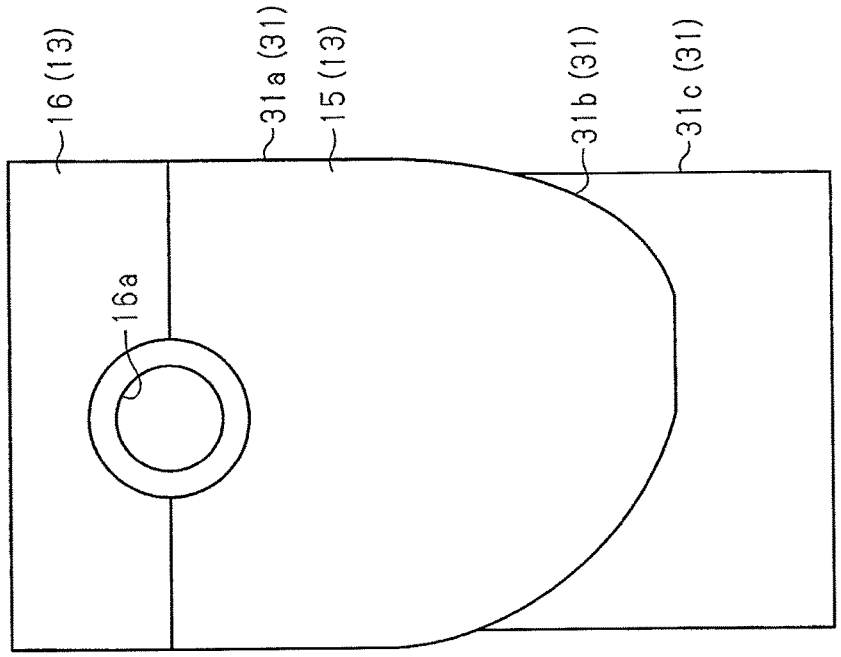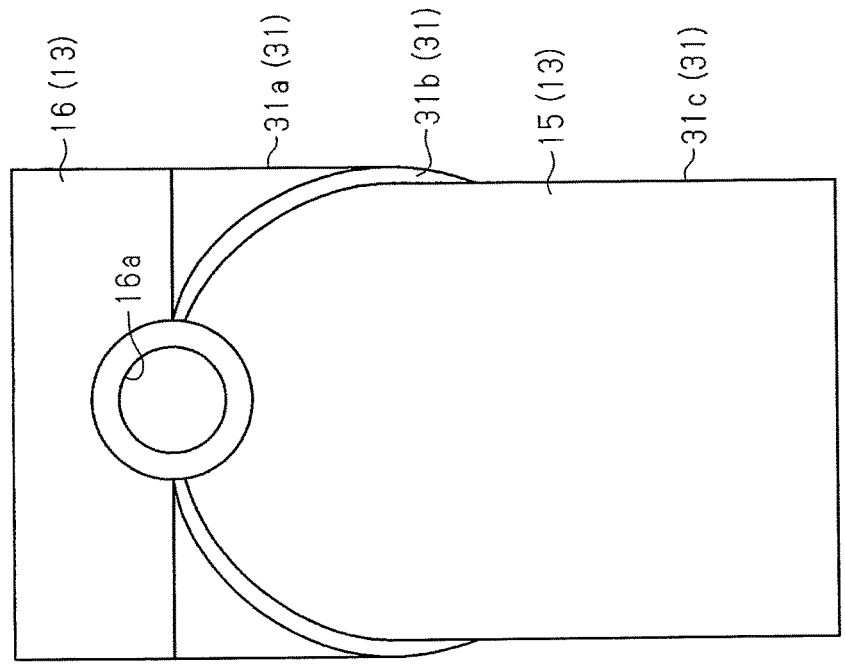

ION EXCHANGER

BACKGROUND OF THE INVENTION

The present disclosure relates to an ion exchanger.

When a fuel cell is mounted on, for example, a vehicle, the vehicle includes a cooling circuit, through which a coolant flows to cool the fuel cell. This limits an increase in the temperature of the fuel cell when producing electricity.

In a new cooling circuit that has just been manufactured, many ions (cations) are eluted from, for example, a pipe into the coolant of the cooling circuit. This results in a sudden increase in the concentration of ions in the coolant. Even if the elution of ions into the coolant diminishes as time elapses, when the fuel cell is cooled by the coolant, components of the coolant are decomposed by heat to cause the generation of ions (anions). This gradually increases the concentration of ions in the coolant.

In the above cooling circuit, such increases in the concentration of ions contained in the coolant may corrode a metal portion of the cooling circuit or increase the electrical conductivity of the coolant, which adversely affects the function of the fuel cell. Thus, the cooling circuit includes an ion exchanger to remove ions from the coolant through ion exchange performed by an ion exchange resin (refer to Japanese Patent No. 4113715).

In an ion exchanger, the ion exchange resin periodically needs to be replaced with a new one. Thus, the ion exchanger has a structure that facilitates the replacement of the ion exchange resin. More specifically, the ion exchanger includes a housing that is open upwardly. The housing includes an inlet, which draws in the coolant from the cooling circuit, and an outlet, which discharges the coolant to the cooling circuit out of the housing. Additionally, a cartridge that contains the ion exchange resin is mounted within the housing so as to be removable upwardly through the opening of the housing.

When the coolant flows from the cooling circuit via the inlet into the housing and passes through the ion exchange resin of the cartridge, the ion exchange resin performs ion exchange to remove ions from the coolant. After the removal of ions, the coolant is discharged out of the housing to the cooling circuit via the outlet. The replacement of the ion exchange resin in the ion exchanger is performed by removing the ion exchange resin upwardly out of the housing together with the cartridge and then installing another cartridge that contains a new ion exchange resin downwardly into the housing.

SUMMARY OF THE INVENTION

To effectively remove ions from the coolant when the cooling circuit has just been manufactured and the coolant has a high ion concentration, an enlarged cartridge needs to be mounted within the housing of the ion exchanger so that a large amount of ion exchange resin is provided. However, enlargement of the cartridge in a horizontal direction is limited due to a limited installation space of a vehicle or the like for an ion exchanger (cartridge). Hence, the cartridge needs to be enlarged in a vertical direction.

When the cartridge mounted within the housing is enlarged in the vertical direction, the coolant needs to pass through the ion exchange resin contained in the cartridge in the vertical direction to effectively use the ion exchange resin. This extends a flow path of the coolant when passing through the ion exchange resin. As a result, pressure loss is increased as the coolant passes through the ion exchange resin.

It is an object of the present invention to provide an ion exchanger that reduces pressure loss when a coolant passes through an ion exchange resin contained in a cartridge.

One aspect of the present invention is an ion exchanger that includes a housing and a cartridge. The housing includes an inlet and an outlet for a coolant. The housing is open upwardly. The cartridge is mounted within the housing so as to be removable upwardly out of the housing. The cartridge is capable of containing an ion exchange resin. The ion exchanger is configured to remove ions from the coolant when the coolant flowing through the housing passes through the ion exchange resin contained in the cartridge. The cartridge includes a first case, which is located above the inlet and the outlet in the housing and is capable of containing the ion exchange resin, and a second case, which is located below the inlet and the outlet in the housing and is capable of containing the ion exchange resin. The first case includes a first flow entrance in fluid communication with the inlet of the housing to draw in the coolant, and a first flow exit in fluid communication with the outlet of the housing to discharge the coolant. The second case includes a second flow entrance in fluid communication with the inlet of the housing to draw in the coolant and a second flow exit in fluid communication with the outlet of the housing to discharge the coolant.

Other aspects and advantages of the present invention will become apparent from the following description, taken in conjunction with the accompanying drawings, illustrating by way of example the principles of the present invention.

BRIEF DESCRIPTION OF THE DRAWINGS

FIG. 8A is a side view of the second case and the pipe of FIG. 7 taken from an inlet side of a housing.

FIG. 8B is a side view of the second case and the pipe of FIG. 7 taken from an outlet side of the housing.

DETAILED DESCRIPTION OF THE PREFERRED EMBODIMENTS

First Embodiment

A first embodiment of an ion exchanger will now be described with reference to FIGS. 1 to 5.

Figure 1:
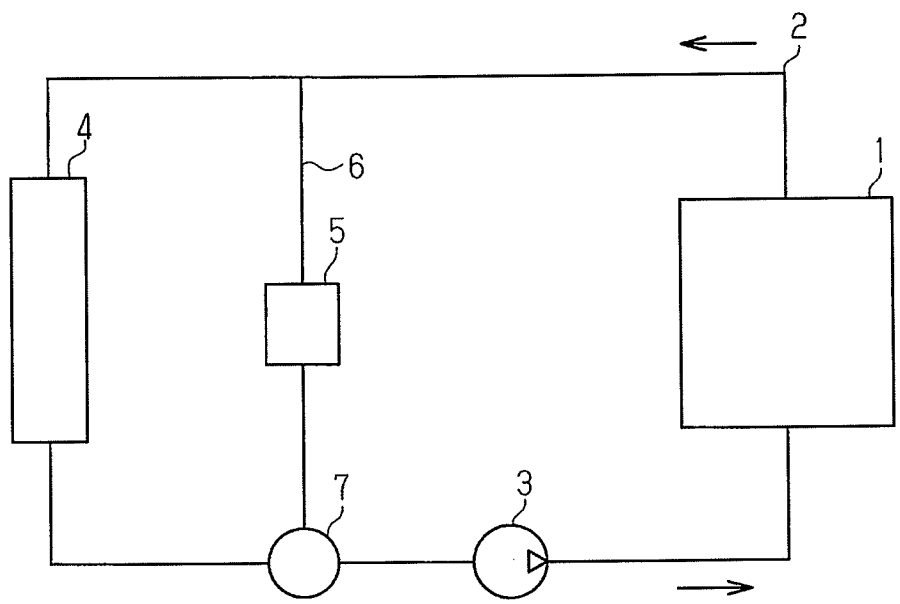
FIG. 1 is a schematic diagram showing the entire structure of a cooling circuit that includes one embodiment of an ion exchanger.

As shown in FIG. 1, a fuel cell 1 is mounted on a vehicle that includes a cooling circuit 2, through which a coolant flows to cool the fuel cell 1. The coolant is, for example, cooling water containing ethylene glycol (long life coolant). The cooling circuit 2 includes a pump 3, which is driven to circulate the coolant.

In the cooling circuit 2, the fuel cell 1 is located at the downstream side of the pump 3. The cooling circuit 2 includes a radiator 4, which is located at the downstream side of the fuel cell 1 and the upstream side of the pump 3. The fuel cell 1, the temperature of which increases when producing electricity, is cooled by the coolant that circulates in the cooling circuit 2 and passes through the fuel cell 1. The coolant receives heat from the fuel cell 1, and the temperature of the coolant is increased. The coolant is cooled by external air when passing through the radiator 4. Then, the coolant flows into the pump 3.

The cooling circuit 2 includes an ion exchanger 5, which removes ions from the coolant, and a bypass pipe 6, which directs the coolant to the ion exchanger 5. The ion exchanger 5 is located in an intermediate portion of the bypass pipe 6. One end of the bypass pipe 6 is connected to a portion of the cooling circuit 2 located at the downstream side of the fuel cell 1 and the upstream side of the radiator 4. The other end of the bypass pipe 6 is connected by a valve 7 to a portion of the cooling circuit 2 located at the downstream side of the radiator 4 and the upstream side of the pump 3.

The opening-closing action of the valve 7 determines whether or not to send the coolant, which has passed through the fuel cell 1, to the bypass pipe 6 (ion exchanger 5). More specifically, when the valve 7 is closed, the coolant does not flow into the bypass pipe 6 but flows toward the radiator 4. When the valve 7 is open, some of the coolant that has passed through the fuel cell 1 flows into the bypass pipe 6 instead of flowing toward the radiator 4. When the coolant flows into the bypass pipe 6, ions are removed from the coolant when the coolant passes through the ion exchanger 5. Subsequently, the coolant flows to the portion of the cooling circuit 2 located at the downstream side of the radiator 4 and the upstream side of the pump 3.

The structure of the ion exchanger 5 will now be described.

Figure 2:
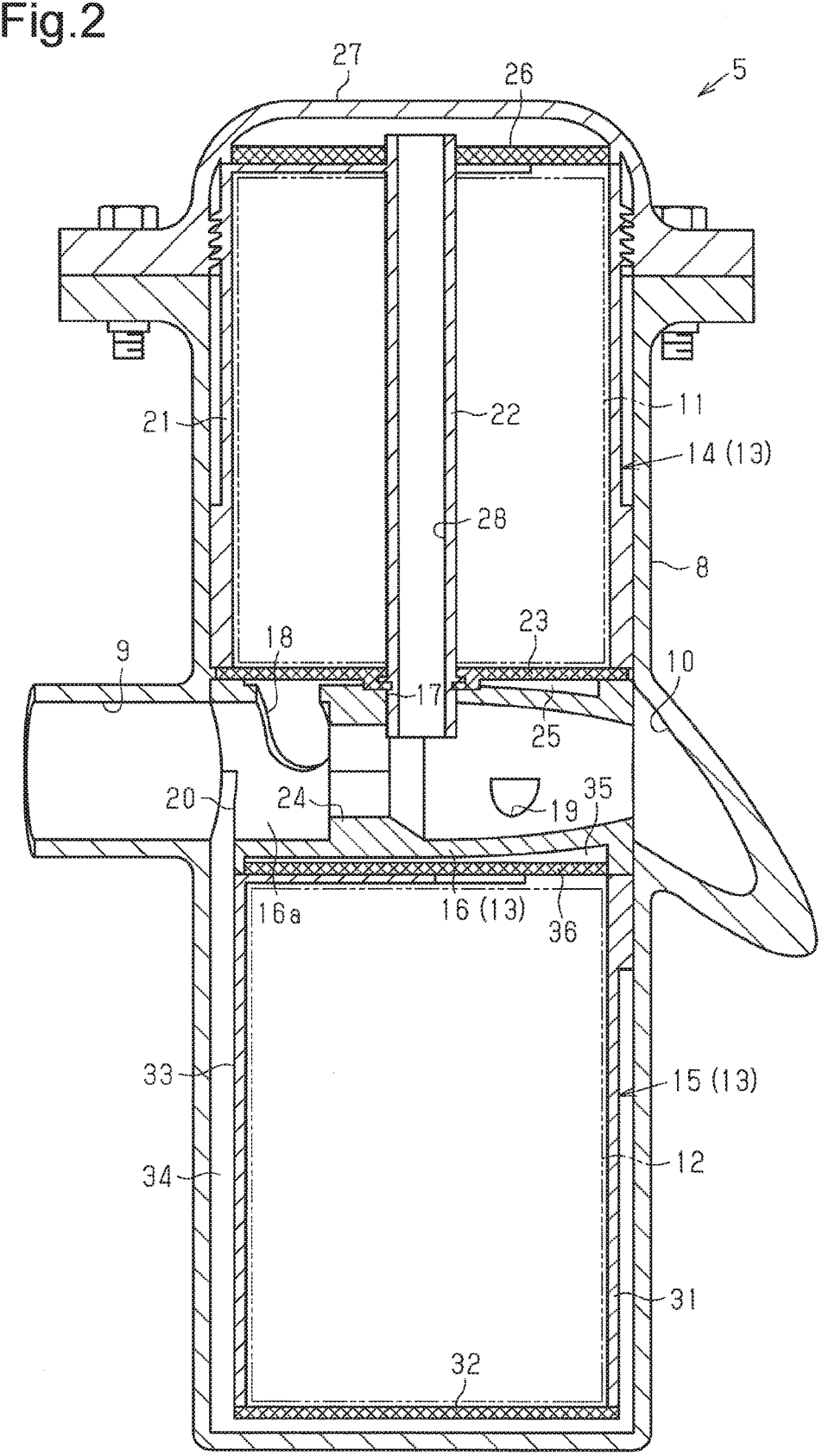
FIG. 2 is a cross-sectional view showing a first embodiment of an ion exchanger.

As shown in FIG. 2, the ion exchanger 5 includes a housing 8, which extends in a vertical direction and is open upwardly. The housing 8 has a vertically central portion that includes an inlet 9, which is in fluid communication with a portion of the bypass pipe 6 (refer to FIG. 1) located at the upstream side of the ion exchanger 5 to draw the coolant into the housing 8. The vertically central portion of the housing 8 includes an outlet 10 at a side opposite to the inlet 9. The outlet 10 discharges the coolant out of the housing 8. The outlet 10 is in fluid communication with a portion of the bypass pipe 6 (refer to FIG. 1) located at the downstream side of the ion exchanger 5.

A cartridge 13, which contains ion exchange resins 11, 12, is mounted within the housing 8. The ion exchange resins 11, 12 contain an anion exchange resin and a cation exchange resin that are mixed at a predetermined ratio. The cartridge 13 is removable upwardly through the opening of the housing 8. In the ion exchanger 5, when the coolant flowing through the housing 8 passes through the ion exchange resins 11, 12, which are contained in the cartridge 13, ions are removed from the coolant.

The cartridge 13 includes a pipe 16, which includes a passage 16a extending in the housing 8 in a horizontal direction to connect the inlet 9 and the outlet 10. The cartridge 13 further includes a first case 14, which is located above the inlet 9 and the outlet 10 in the housing 8 and capable of containing the ion exchange resin 11, and a second case 15, which is located below the inlet 9 and the outlet 10 in the housing 8 and capable of containing the ion exchange resin 12. The first case 14 and the second case 15 are respectively fixed to an upper surface and a lower surface of the pipe 16. The pipe 16 separates the first case 14 from the second case 15.

Figure 3A:
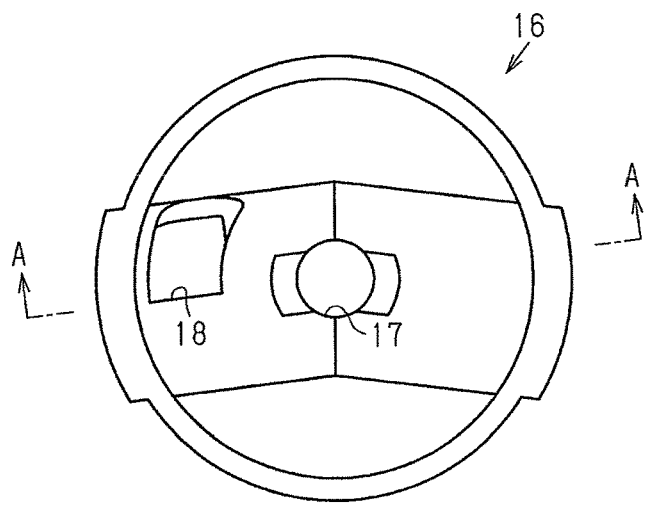
FIG. 3A is an upper view showing a pipe of the ion exchanger of FIG. 2.
Figure 3B:
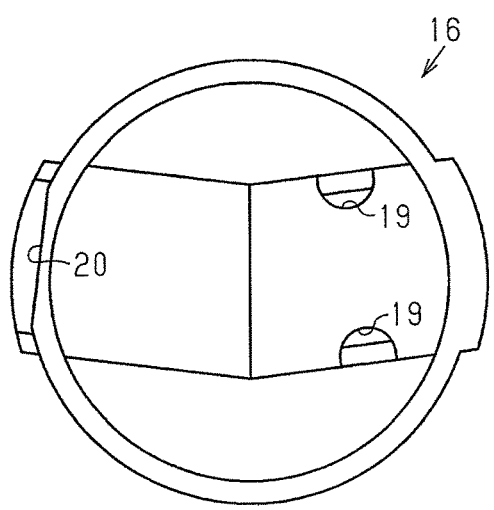
FIG. 3B is a bottom view showing the pipe of the ion exchanger of FIG. 2.
Figure 3C:
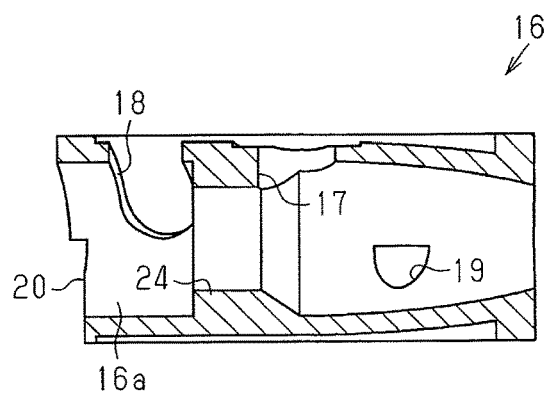
FIG. 3C is a cross-sectional view of the pipe taken along line A-A shown in FIG. 3A.

FIG. 3A is an upper view of the pipe 16 of the ion exchanger 5 shown in FIG. 2. FIG. 3B is a bottom view of the pipe 16. FIG. 3C is a cross-sectional view of the pipe 16 taken along line A-A in FIG. 3A. As shown in FIG. 3A, a central portion of the pipe 16 has an insertion hole 17 formed in an upper surface of the pipe 16. Additionally, a first communication hole 18 extends through a portion of the pipe 16 located at the left side of the insertion hole 17 and is open in the upper surface of the pipe 16. As shown in FIGS. 3B and 3C, a second communication hole 19 extends through a right portion of the pipe 16 and is open in the lower surface of the pipe 16, and a slit 20 extends in a left end portion of the pipe 16 and is open in the lower surface of the pipe 16.

As shown in FIG. 2, the passage 16a of the pipe 16 is in communication with the insertion hole 17, the first communication hole 18, the second communication hole 19, and the slit 20. A portion of the passage 16a located between the inlet 9 and the outlet 10 includes a reduced diameter portion 24, which has a flow area for the coolant that is smaller than those of other portions. The first communication hole 18 is located at a portion between the inlet 9 and the reduced diameter portion 24. The insertion hole 17 is located at a portion between the outlet 10 and the reduced diameter portion 24. The slit 20 is located at a portion between the inlet 9 and the reduced diameter portion 24 and adjacent to the inlet 9. The second communication hole 19 is located at a portion between the outlet 10 and the reduced diameter portion 24.

Figure 4A:
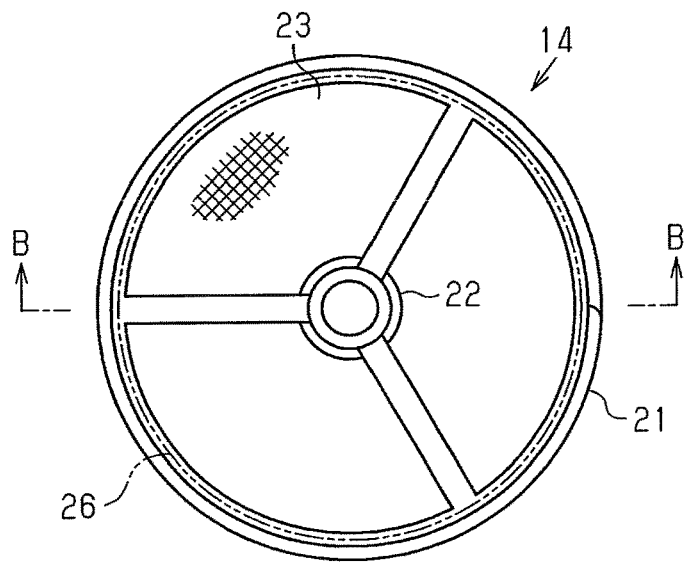
FIG. 4A is an upper view showing a first case of the ion exchanger of FIG. 2.
Figure 4B:
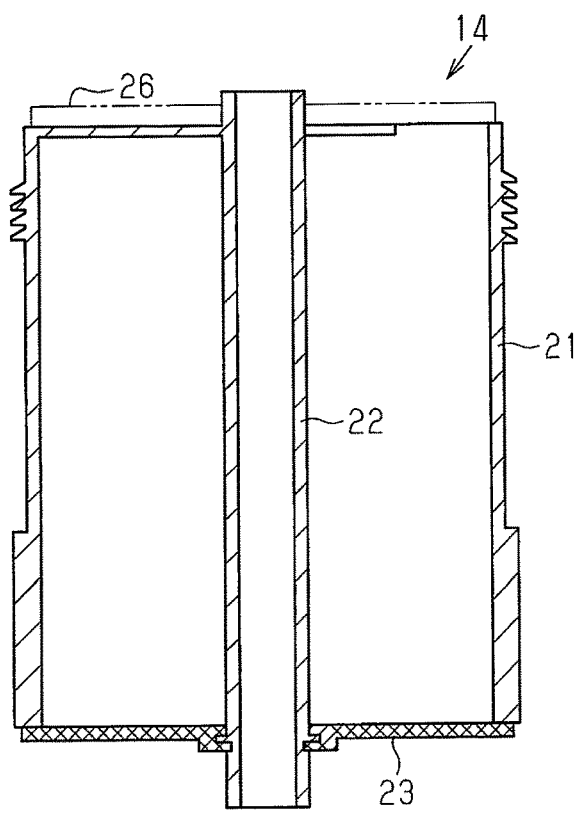
FIG. 4B is a cross-sectional view of the first case taken along line B-B shown in FIG. 4A.

FIG. 4A is an upper view of the first case 14. FIG. 4B is a cross-sectional view of the first case 14 taken along line B-B in FIG. 4A. The first case 14 includes a tubular wall 21, which extends in the vertical direction, and a tube member 22, which extends in an inner side of the wall 21 in the vertical direction and is supported by the wall 21. The tube member 22 extends along the axis of the tubular wall 21. The ion exchange resin 11 (refer to FIG. 2) is containable between the tube member 22 and the wall 21. The first case 14 has a lower opening, on which a mesh 23 is located to allow the coolant to pass through. The lower end of the tube member 22 extends through a center of the mesh 23.

As shown in FIG. 2, with the first case 14 fixed to the upper surface of the pipe 16, the lower end of the tube member 22 is inserted into the insertion hole 17 of the pipe 16, and the inner cavity of the tube member 22 is in communication with a portion of the passage 16a of the pipe 16 located at the downstream side of the reduced diameter portion 24. Additionally, in this state, a space between the mesh 23 of the first case 14 and the upper surface of the pipe 16 serves as a first flow entrance 25, which fluidly connects the lower end of the first case 14 (lower opening of first case 14) and the first communication hole 18 of the pipe 16. The first flow entrance 25, which is in fluid communication with the inlet 9 of the housing 8 via the first communication hole 18 and the passage 16a of the pipe 16, draws the coolant from the inlet 9 into the first case 14.

The first case 14 has an upper end opening, over which a mesh 26 is placed to allow the coolant to pass through. The upper end of the tube member 22 extends through a center of the mesh 26. A cap 27 is fastened to the upper end portion of the wall 21 to close the upper end opening of the first case 14. The upper end of the tube member 22 is located at an inner side of the cap 27. The inner cavity of the tube member 22 is in fluid communication with the outlet 10 of the housing 8 via the passage 16a of the pipe 16. The inner cavity of the tube member 22 serves as a first flow exit 28, which discharges the coolant out of the first case 14. The cap 27 is bolted to the upper end of the housing 8. When unbolted, the cap 27 can be removed from the upper end of the housing 8.

Figure 5A:
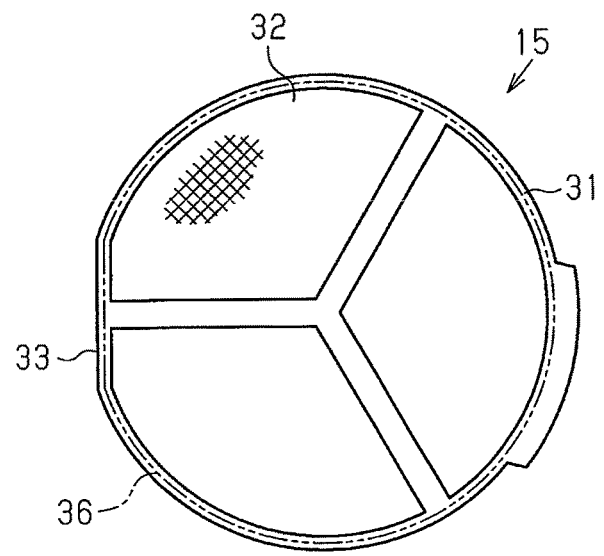
FIG. 5A is an upper view showing a second case of the ion exchanger of FIG. 2.
Figure 5B:
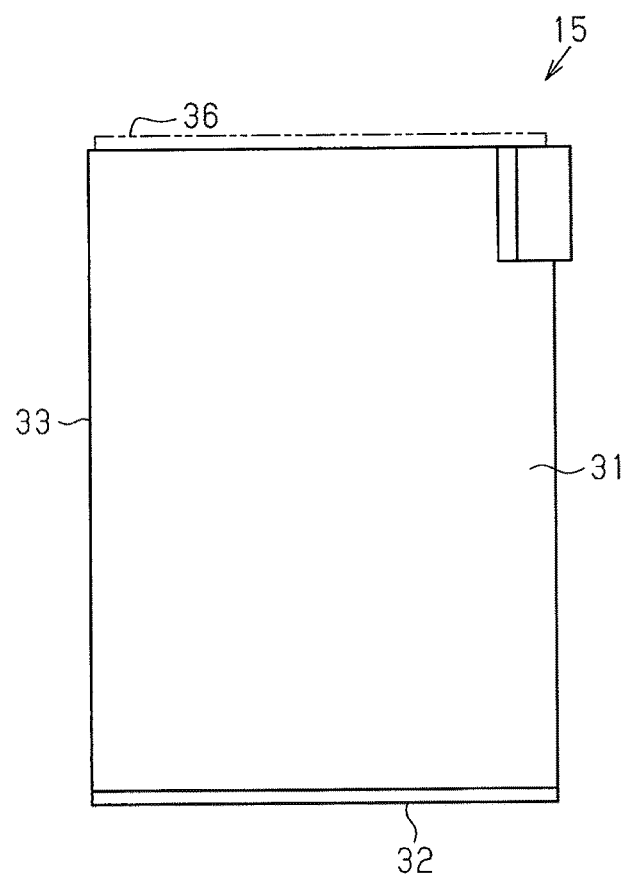
FIG. 5B is a side view of the second case of FIG. 5A.

FIG. 5A is an upper view of the second case 15. FIG. 5B is a side view of the second case 15. The second case 15 includes a tubular wall 31, which extends in the vertical direction. The outer diameter of the wall 31 is slightly smaller than the inner diameter of the housing 8 (refer to FIG. 2). The wall 31 includes a portion (left end portion in FIGS. 5A and 5B) defining a flat portion 33, which extends between the upper end and the lower end of the wall 31. The ion exchange resin 12 (refer to FIG. 2) is containable in an inner side of the wall 31. The second case 15 has a lower opening, on which a mesh 32 is located to allow the coolant to pass through. The second case 15 has an upper opening, on which a mesh 36 is located to allow the coolant to pass through.

As shown in FIG. 2, with the second case 15 fixed to the lower surface of the pipe 16, the upper end of the wall 31 is in contact with the lower surface of the pipe 16. In this state, a space between the flat portion 33 of the wall 31 and an inner circumferential surface of the housing 8 is located corresponding to the slit 20 of the pipe 16 and communicates with the slit 20. Additionally, the mesh 32 of the second case 15 is spaced apart from the inner bottom surface of the housing 8 by a gap. The gap is in communication with the space between the flat portion 33 of the wall 31 and the inner circumferential surface of the housing 8. The space in the second case 15 between the flat portion 33 of the wall 31 and the inner circumferential surface of the housing 8 serves as a second flow entrance 34, which draws the coolant into the second case 15. The second flow entrance 34 is in fluid communication with the inlet 9 of the housing 8 via the slit 20 and the passage 16a of the pipe 16, as well as with the lower opening of the second case 15 via the gap between the mesh 32 and the inner bottom surface of the housing 8, and the mesh 32.

In a state in which the second case 15 is fixed to the lower surface of the pipe 16, the upper end of the wall 31 is in contact with the lower surface of the pipe 16. This disconnects the upper end opening of the second case 15 from the slit 20 of the pipe 16 and communicates the upper end opening of the second case 15 with the second communication hole 19 of the pipe 16 via a space between the upper end of the second case 15 and the lower surface of the pipe 16. The space between the upper end of the second case 15 and the lower surface of the pipe 16, which is in fluid communication with the outlet 10 of the housing 8 via the second communication hole 19 and the passage 16a of the pipe 16, serves as a second flow exit 35 that discharges the coolant out of the second case 15 (wall 31).

The operation of the ion exchanger 5 will now be described.

In a new cooling circuit 2 that has just been manufactured, many ions (cations) are eluted from the pipe and the like into the coolant of the cooling circuit 2. This may result in a sudden increase in the concentration of ions in the coolant. In this case, to effectively remove the ions from the coolant with the ion exchanger 5, the cartridge 13, which includes the first case 14 containing the ion exchange resin 11 and the second case 15 containing the ion exchange resin 12, is mounted within the housing 8 of the ion exchanger 5. The mixture ratio of the cation exchange resin and the anion exchange resin contained in the ion exchange resins 11, 12 is set to a ratio allowing for the effective removal of ions from the coolant.

In the ion exchanger 5, the coolant flowing from the inlet 9 into the housing 8 flows into the passage 16a of the pipe 16 of the cartridge 13. Some of the coolant flowing in the passage 16a is discharged out of the outlet 10 of the housing 8 through the reduced diameter portion 24, while the remaining of the coolant is discharged out of the outlet 10 of the housing 8 through one of the first case 14 and the second case 15 of the cartridge 13. The following describes, separately, the flow of the coolant passing through the first case 14 and the flow of the coolant passing through the second case 15.

The pressure in the passage 16a is higher at the upstream side of the reduced diameter portion 24 than at the downstream side of the reduced diameter portion 24. Thus, the pressure in the first case 14 is higher at the side of the first flow entrance 25 than at the side of the first flow exit 28. Such pressure differences cause some of the coolant to flow from the passage 16a through the first case 14. More specifically, the coolant flows from the first flow entrance 25 into the first case 14 (lower end of wall 21) and upwardly passes through the ion exchange resin 11 from a lower side, during which the ion exchange resin 11 performs ion exchange to remove ions from the coolant. After the removal of ions, the coolant flows out of the first case 14 (and into passage 16a) via the first flow exit 28 and then out of the housing 8 via the outlet 10 of the housing 8.

The pressure in the passage 16a is higher at the upstream side of the reduced diameter portion 24 than the downstream side of the reduced diameter portion 24. Thus, the pressure in the second case 15 is also higher at the side of the second flow entrance 34 than at the side of the second flow exit 35. Such pressure differences cause some of the coolant to flow from the passage 16a through the second case 15. More specifically, the coolant flows from the second flow entrance 34 into the second case 15 (lower end of wall 31) and upwardly passes through the ion exchange resin 12 from the lower side, during which the ion exchange resin 12 performs ion exchange to remove ions from the coolant. After the removal of ions, the coolant flows out of the second case 15 (and into passage 16a) via the second flow exit 35 and then out of the housing 8 via the outlet 10 of the housing 8.

As described above, the flow of the coolant passing through the first case 14 (ion exchange resin 11) and the flow of the coolant passing through the second case 15 (ion exchange resin 12) are separately generated as the flows of the coolant passing in the housing 8 through the ion exchange resins 11, 12, that is, the flows of the coolant in the cartridge 13. In other words, when the coolant passes through the ion exchange resins 11, 12 contained in the cartridge 13, the flow path of the coolant is divided into two lines, that is, a flow path through the first case 14 and a flow path through the second case 15. Thus, each flow path of the two lines is shortened. This reduces the pressure loss when the coolant passes through each flow path.

When replacing the ion exchange resins 11, 12 of the ion exchanger 5 with new resins, the cartridge 13 is entirely replaced with a new cartridge. More specifically, the cap 27 is unbolted from the upper end of the housing 8, and the cartridge 13 is removed upwardly out of the housing 8. Then, another cartridge 13, which contains new ion exchange resins 11, 12, is inserted downwardly into the housing 8. The cap 27 is bolted to the housing 8. In this manner, the cartridge 13 is mounted within the housing 8.

When replacing the cartridge 13 of the ion exchanger 5 with a new cartridge, time may have elapsed from the manufacturing of the cooling circuit 2 and increases in the concentration of ions in the coolant may be only gradual. In such a situation where the effective removal of ions from the coolant is unnecessary, the cartridge 13 in which only the first case 14 contains the ion exchange resin 11 is mounted within the housing 8. In this case, ions are sufficiently removed from the coolant only by the ion exchange resin 11 contained in the first case 14. This prevents the amount of the ion exchange resin contained in the cartridge 13 from being excessive for removing ions from the coolant. In the cartridge 13 having such a structure, it is preferred that at least one of the slit 20 and the second communication hole 19 of the pipe 16 be sealed. Additionally, in this state, it is preferred that the coolant flow area of the reduced diameter portion 24 be adjusted so that the coolant flows through the first case 14 at an appropriate flow rate.

The first embodiment described above has the following advantages.

(1) When the cartridge 13 including the first case 14 and the second case 15 that contain the ion exchange resins 11, 12 is mounted within the housing 8, the flow path of the coolant passing through the ion exchange resins 11, 12 is divided into two lines, that is, a flow path extending through the first case 14 and a flow path extending through the second case 15, so that the flow paths are each shortened. This reduces the pressure loss when the coolant flows through each flow path.

(2) If the effective removal of ions from the coolant is unnecessary, the cartridge 13 in which only the first case 14 contains the ion exchange resin 11 may be used. This limits situations in which the amount of the ion exchange resin contained in the cartridge 13 is excessive for removing ions from the coolant.

(3) When the coolant passes through the first case 14, the coolant flows from the passage 16a of the pipe 16 into the lower end of the first case 14 via the first flow entrance 25. After the coolant upwardly flows through the first case 14, the coolant is discharged out of the first case 14 via the upper end and the inner cavity (first flow exit 28) of the tube member 22. This allows the coolant upwardly passing through the first case 14 from the lower side to effectively contact the ion exchange resin 11 contained in the first case 14. The ions are effectively removed from the coolant through ion exchange performed by the ion exchange resin 11.

(4) When the coolant passes through the second case 15, the coolant flows from the passage 16a of the pipe 16 into the lower end of the second case 15 via the second flow entrance 34. After the coolant upwardly flows through the second case 15, the coolant is discharged out of the second case 15 via the second flow exit 35. This allows the coolant upwardly passing through the second case 15 from the lower side to effectively contact the ion exchange resin 12 contained in the second case 15. The ions are effectively removed from the coolant through ion exchange performed by the ion exchange resin 12.

Second Embodiment

A second embodiment of an ion exchanger will now be described with reference to FIGS. 6 to 8.

Figure 6:
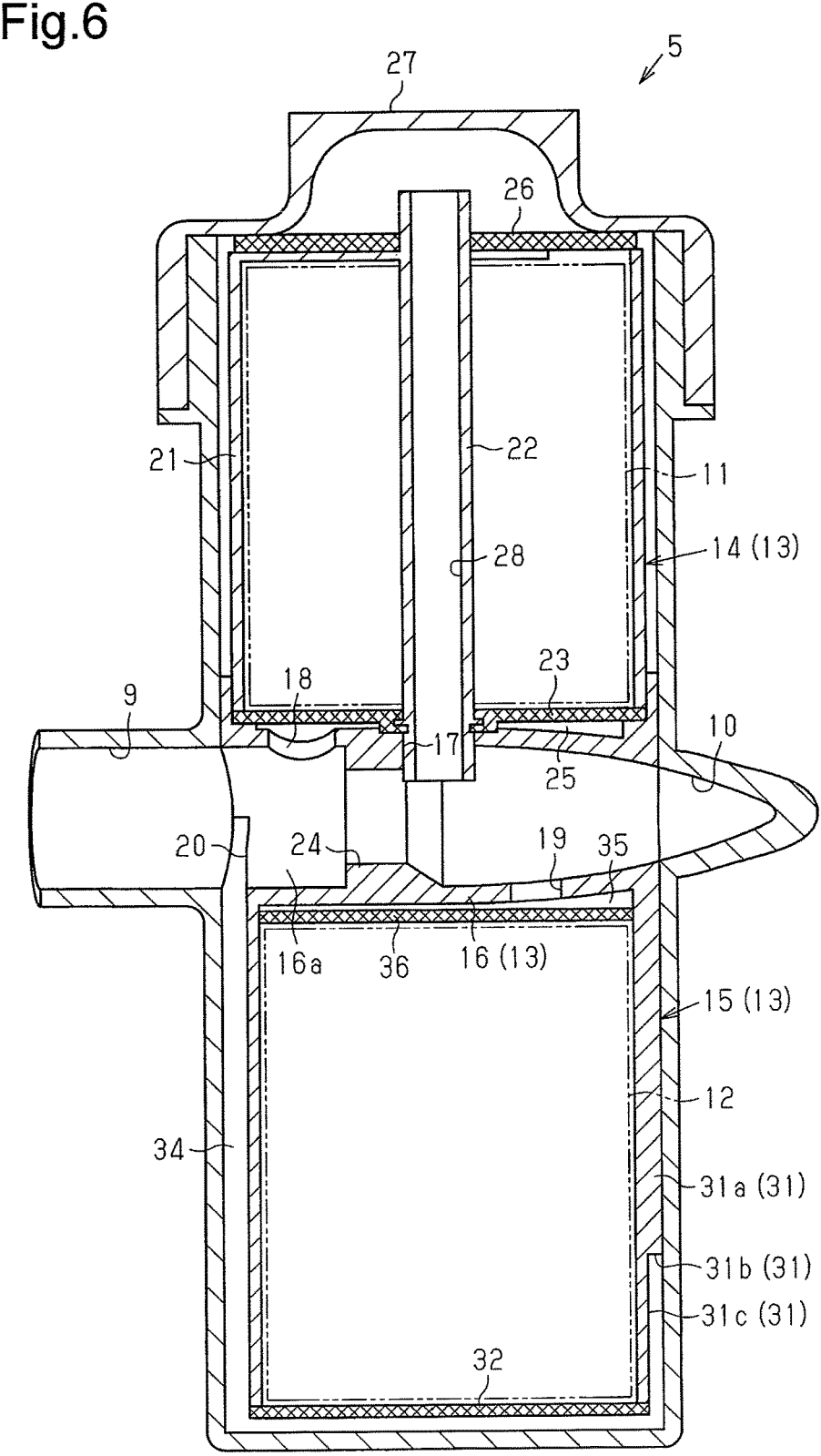
FIG. 6 is a cross-sectional view showing a second embodiment of an ion exchanger.

As shown in FIG. 6, the second embodiment of the ion exchanger 5 differs from the first embodiment in that the pipe 16 and the second case 15 are integrated with each other in the cartridge 13. Additionally, the outer circumferential surface of the wall 31 of the second case 15 has a shape that differs from the first embodiment.

Figure 7:
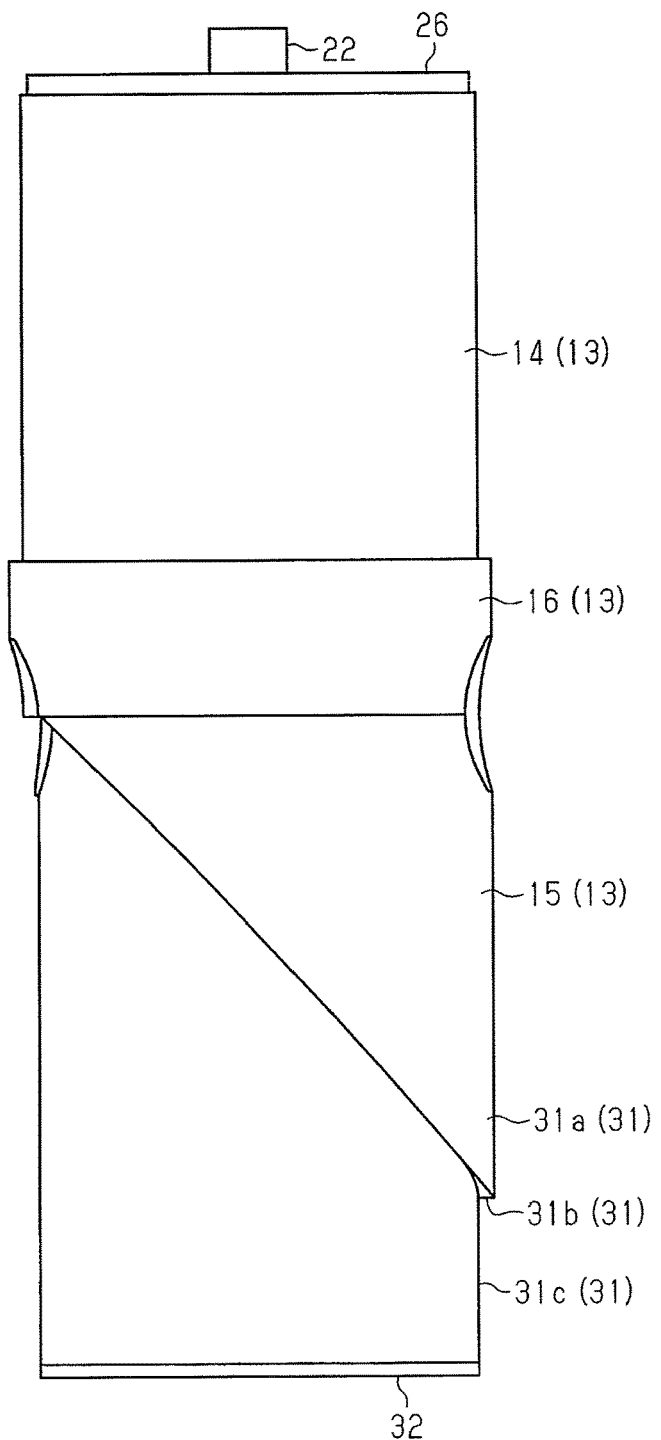
FIG. 7 is a side view showing a first case, a pipe, and a second case of a cartridge of the ion exchanger of FIG. 6.

As shown in FIG. 7, the wall 31 of the second case 15 includes a larger diameter portion 31a located at an upper side of the second case 15 and a smaller diameter portion 31c located below the larger diameter portion 31a. A boundary between the larger diameter portion 31a and the smaller diameter portion 31c defines a step 31b. The outer diameter (diameter of outer surface) of the smaller diameter portion 31c is smaller than the outer diameter (diameter of outer surface) of the larger diameter portion 31a. The second flow entrance 34 is defined as a space between the outer surface of the smaller diameter portion 31c and the inner circumferential surface of the housing 8, which is shown in FIG. 6.

FIG. 8A is a diagram of the second case 15 and the pipe 16 viewed from the side of the inlet 9 of the housing 8 (refer to FIG. 6). FIG. 8B is a diagram of the second case 15 and the pipe 16 viewed from the side of the outlet 10 of the housing 8. As shown in FIGS. 8A, 8B, and 7, the step 31b extends at an angle upwardly toward the inlet 9 of the housing 8.

The operation and advantages of the ion exchanger 5 of the second embodiment will now be described.

(5) In the ion exchanger 5 of the first embodiment shown in FIG. 2, the second flow entrance 34 is extended downwardly straight from a portion of the pipe 16 located closer to the inlet 9 and communicates with the gap between the mesh 32 and the inner bottom surface of the housing 8. Thus, the coolant that reaches the lower end of the second case 15 (gap) via the second flow entrance 34 is localized at a position closer to the inlet 9. As a result, when the coolant flows from the lower end of the second case 15 into the second case 15 and then upwardly through the second case 15 (ion exchange resin 12), the flow rate of the coolant tends to be uneven in the horizontal direction.

However, in the ion exchanger 5 of the second embodiment, when the coolant flows from the pipe 16 into the second flow entrance 34 and then toward the lower end of the second case 15 through the second flow entrance 34, the coolant spreads in the horizontal direction along the guide of the angled step 31b, shown in FIGS. 8A, 8B, and 7, and reaches the lower end of the second case 15. This prevents the localization of the coolant at a position closer to the inlet 9 when the coolant reaches the lower end of the second case 15 via the second flow entrance 34. When the coolant upwardly flows from the lower end of the second case 15 into the second case 15, the flow rate of the coolant is relatively even in the horizontal direction. Therefore, when the coolant passes through the ion exchange resin 12 in the second case 15, ions are further effectively removed from the coolant.

Third Embodiment

A third embodiment of an ion exchanger will now be described with reference to FIGS. 9 to 12. The present embodiment differs from the first and second embodiments in that the reduced diameter portion 24 of the pipe 16 includes a valve mechanism 41, which performs an opening operation and a closing operation to allow the coolant flow area to be variable.

Figure 9:
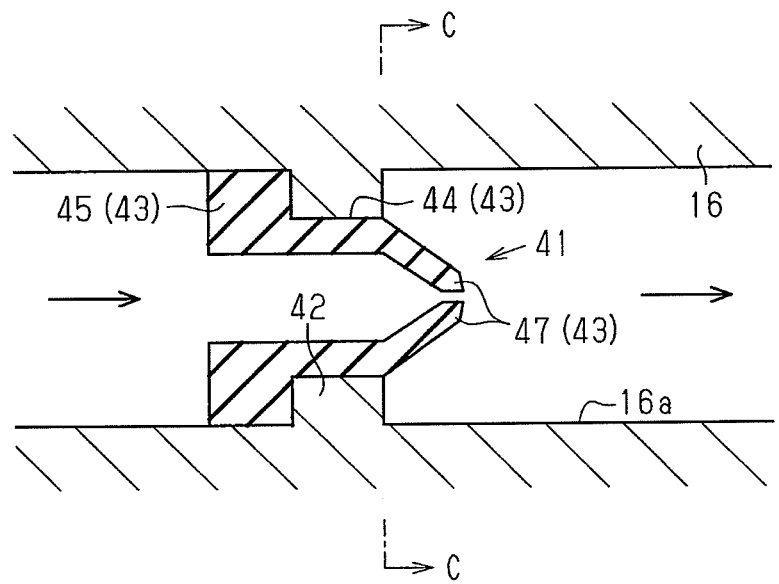
FIG. 9 is a schematic diagram showing a passage in a pipe of an ion exchanger at a portion between an inlet and an outlet.

FIG. 9 schematically shows the passage 16a in the pipe 16 of the ion exchanger 5 according to the third embodiment at a portion between the inlet 9 and the outlet 10. As shown in FIG. 9, the portion of the pipe 16 located between the inlet 9 and the outlet 10 includes a valve mechanism 41, which performs an opening operation and a closing operation to allow the coolant flow area to be variable. The valve mechanism 41 includes an annular flange 42, which projects from an inner surface of the passage 16a toward the axis of the pipe 16, and an adjustment valve 43, which extends through a central portion of the flange 42 from the upstream side (left side in FIG. 9) to the downstream side (right side in FIG. 9) of the pipe 16.

The adjustment valve 43 is formed from an elastic material such as rubber. The adjustment valve 43 includes a tubular body 44, which extends through the central portion of the flange 42, and a projection 45, which projects from an upstream end (left end) of the outer surface of the body 44 toward the inner surface of the pipe 16. The downstream end (right end) of the body 44 projects over the flange 42 toward the downstream side and is tapered so that the diameter is reduced as the body 44 extends toward the downstream side. Thus, the downstream end of the body 44 has a smaller open area than the upstream side.

Figure 10:
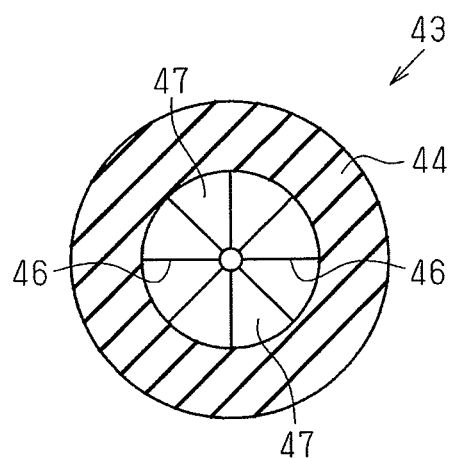
FIG. 10 is a cross-sectional view of an adjustment value taken along line C-C shown in FIG. 9.

FIG. 10 is a cross-sectional view of the adjustment valve 43 taken along line C-C in FIG. 9. As shown in FIG. 10, the tapered portion of the body 44 has slits 46, which radially extend at equal intervals in the circumferential direction. The slits 46 divide the tapered portion of the body 44 into valve members 47, which surround a downstream opening of the body 44 in the circumferential direction. The downstream opening of the body 44 of the adjustment valve 43 (valve mechanism 41), that is, the portion surrounded by the valve members 47, serves as the reduced diameter portion, which has a smaller coolant flow area than other portions of the pipe 16.

Figure 11:
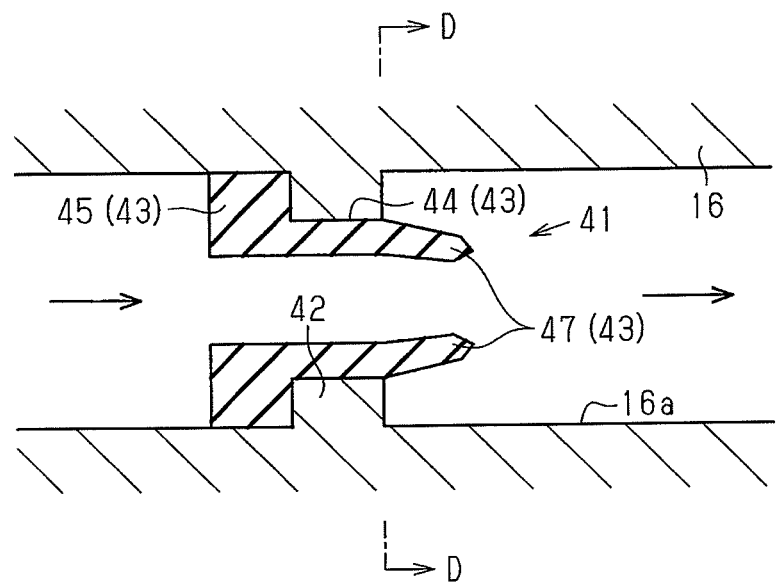
FIG. 11 is a schematic diagram showing the passage in the pipe of the ion exchanger at the portion between the inlet and the outlet.
Figure 12:
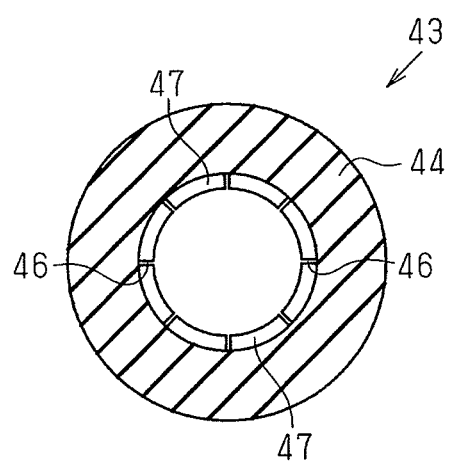
FIG. 12 is a cross-sectional view of the adjustment valve taken along line D-D shown in FIG. 11.

Since the valve members 47 are elastic, when the coolant flows through the body 44 (pipe 16), the valve members 47 elastically deform so that the open area (coolant flow area) of the downstream end of the body 44 becomes larger as the flow rate of the coolant is increased. FIGS. 11 and 12 show that the coolant flow area of the downstream end of the body 44 is increased as a result of elastic deformation of the valve members 47 of the body 44. FIG. 12 is a cross sectional view of the adjustment valve 43 taken along line D-D in FIG. 11.

Each valve member 47 elastically deforms in accordance with the flow rate of the coolant flowing through the body 44 (pipe 16). Thus, when the flow rate of the coolant flowing through the pipe 16 is less than a threshold value (hereafter, referred to as "when the flow rate is low"), the adjustment valve 43 (valve mechanism 41) decreases the coolant flow area of the downstream end of the body 44 compared to when the flow rate is greater than or equal to the threshold value (hereafter, referred to as "when the flow rate is high"). This limits a decrease in the pressure difference between the upstream side and the downstream side of the adjustment valve 43 even when the flow rate is low.

The operation of the ion exchanger 5 of the third embodiment will now be described.

In the ion exchanger 5, the flow rate of the coolant passing through the ion exchange resin 11 in the first case 14 and the flow rate of the coolant passing through the ion exchange resin 12 in the second case 15 change in accordance with the pressure difference of the passage 16a in the pipe 16 between the upstream side and the downstream side of the adjustment valve 43. More specifically, an increase in the pressure difference increases the flow rate of the coolant passing through the ion exchange resin 11 in the first case 14 and the flow rate of the coolant passing through the ion exchange resin 12 in the second case 15. On the other hand, a decrease in the pressure difference decreases the flow rate of the coolant passing through the ion exchange resin 11 in the first case 14 and the flow rate of the coolant passing through the ion exchange resin 12 in the second case 15.

The pressure difference of the passage 16a in the pipe 16 between the upstream side and the downstream side of the adjustment valve 43 is affected by the flow rate of the coolant passing through the passage 16a. More specifically, if the adjustment valve 43 constantly has a fixed open area (coolant flow area) at the downstream end of the body 44, the pressure difference will be increased as the flow rate of the coolant passing through the passage 16a is increased. Also, the pressure difference will be decreased as the flow rate of the coolant is decreased. Thus, when the flow rate is low, if the pressure difference of the passage 16a is decreased between the upstream side and the downstream side of the adjustment valve 43, the flow rate of the coolant passing through the ion exchange resin 11 in the first case 14 and the flow rate of the coolant passing through the ion exchange resin 12 in the second case 15 are decreased. This may adversely affect the efficiency of the ion exchange resins 11, 12 for removing ions from the coolant.

However, in the adjustment valve 43 (valve mechanism 41), as compared to when the flow rate is high, the valve members 47 elastically deform to decrease the coolant flow area of the downstream end of the body 44 when the flow rate is low. Thus, a decrease in the pressure difference of the passage 16a between the upstream side and the downstream side of the adjustment valve 43 is limited even when the flow rate is low. This limits the decreases in the flow rate of the coolant passing through the ion exchange resin 11 in the first case 14 and the flow rate of the coolant passing through the ion exchange resin 12 in the second case 15. Therefore, the efficiency of the ion exchange resins 11, 12 for removing ions from the coolant will not be adversely affected.

The present embodiment has the advantages described below in addition to the advantages of the first and second embodiments.

(6) When the flow rate is low, decreases in the flow rate of the coolant passing through the ion exchange resin 11 in the first case 14 and the flow rate of the coolant passing through the ion exchange resin 12 in the second case 15 are limited. Therefore, the efficiency of the ion exchange resins 11, 12 for removing ions from the coolant will not be adversely affected.

Other Embodiments

The above embodiments may be modified as follows.

The housing 8 of the ion exchanger 5 may be inclined from the vertical direction about the axis of the pipe 16.

In the first and second embodiments, if the effective removal of ions from the coolant is unnecessary, the cartridge 13 in which only the second case 15 contains the ion exchange resin 12 may be mounted within the housing 8. In this case, in the cartridge 13, it is preferred that at least one of the first communication hole 18 and the insertion hole 17 of the pipe 16 be sealed. Additionally, in this state, it is preferred that the coolant flow area of the reduced diameter portion 24 be adjusted so that the coolant flows through the second case 15 at an appropriate flow rate.

In the second embodiment, the pipe 16 and the second case 15 may be separate from each other in the same manner as the first embodiment.

Figure 13:
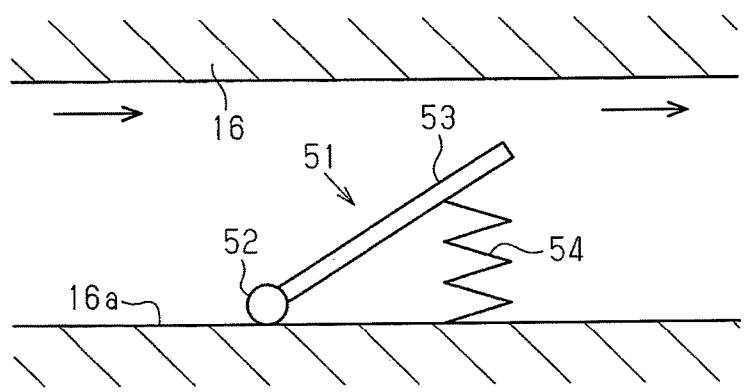
FIG. 13 is a schematic diagram showing another example of a valve mechanism.
Figure 14:
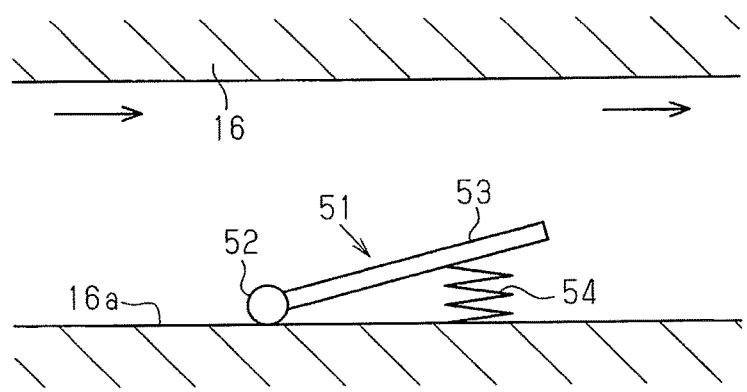
FIG. 14 is a schematic diagram showing the valve mechanism of FIG. 13.

The third embodiment may include a valve mechanism 51, which is shown in FIGS. 13 and 14, instead of the valve mechanism 41. The valve mechanism 51 includes a shaft 52, a plate-shaped valve member 53, which pivots about the shaft 52 to perform an opening operation and a closing operation to allow the coolant flow area of the passage 16a in the pipe 16 to be variable, and a spring 54, which urges the valve member 53 in a closing direction (direction in which coolant flow area is decreased). In this case, the portion of the passage 16a in the pipe 16 having the coolant flow area that is allowed to be variable by the valve member 53 serves as the reduced diameter portion, which is smaller than other portions of the pipe 16. In this structure, when the flow rate is low (refer to FIG. 13), the valve member 53 of the valve mechanism 51 decreases the coolant flow area of the passage 16a compared to when the flow rate is high (refer to FIG. 14).

Figure 15:
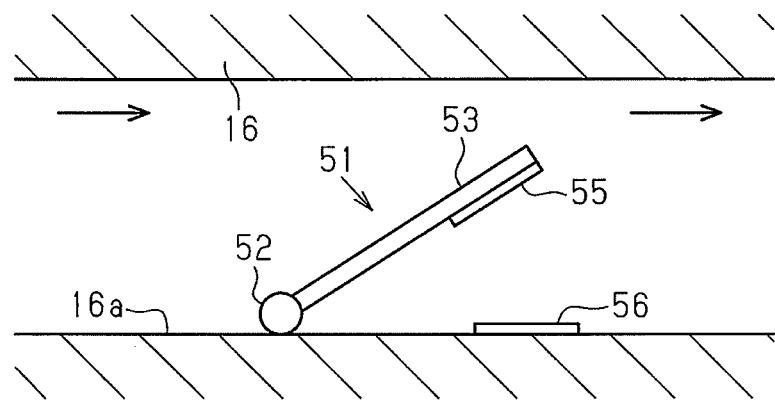
FIG. 15 is a schematic diagram showing another example of a valve mechanism.
Figure 16:
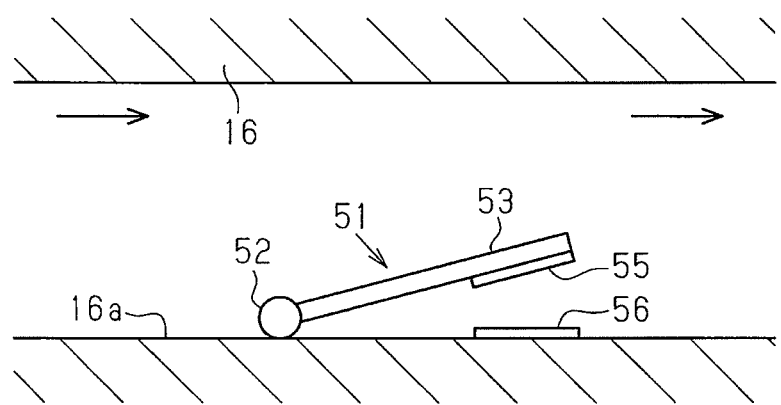
FIG. 16 is a schematic diagram showing the valve mechanism of FIG. 15.

The valve mechanism 51 shown in FIGS. 13 and 14 may include magnets instead of the spring 54 to urge the valve member 53 in the closing direction (direction in which coolant flow area is decreased). In this case, as shown in FIGS. 15 and 16, while the valve member 53 includes a magnet 55, the pipe 16 includes a magnet 56 that repels the magnet 55. Consequently, the repulsion force between the magnet 55 and the magnet 56 urges the valve member 53 in a direction in which the coolant flow area of the passage 16a of the pipe 16 is decreased. In this structure, when the flow rate is low (refer to FIG. 15), the valve member 53 of the valve mechanism 51 decreases the coolant flow area of the passage 16a compared to when the flow rate is high (refer to FIG. 16).

The third embodiment may include, for example, a butterfly valve or a piston valve instead of the adjustment valve 43. The open degree of such a valve may be controlled to allow the coolant flow area of the passage 16a in the pipe 16 to be variable. In this case, the flow rate of the coolant in the passage 16a is detected by a sensor or estimated by, for example, the driving state of the pump 3. When the flow rate is less than a threshold value, the open degree control is performed on the valve to decrease the open degree of the valve compared to when the flow rate is greater than or equal to the threshold value.

The above embodiments are intended to be illustrative, and the present invention is not limited to the above-described embodiments. Various alternatives, modifications and variations are possible to the disclosed exemplary embodiments without departing from the spirit and scope of the present invention. For example, the subject matter of the present invention may exist in fewer features than all of the features of the particular embodiments disclosed. The claims are incorporated into the detailed description and each claim by itself claims a separate embodiment. The scope of the invention is intended to embrace all such alternatives, modifications and variations, along with all equivalents thereof, within the scope of the claims.

The invention claimed is:

1. An ion exchanger comprising:
a housing including an inlet and an outlet for a coolant, wherein the housing is open upwardly; and
a cartridge mounted within the housing so as to be removable upwardly out of the housing, wherein the cartridge is capable of containing an ion exchange resin, wherein
the ion exchanger is configured to remove ions from the coolant when the coolant flowing through the housing passes through the ion exchange resin contained in the cartridge,
the cartridge includes a first case, which is located above the inlet and the outlet in the housing and is capable of containing the ion exchange resin, and a second case, which is located below the inlet and the outlet in the housing and is capable of containing the ion exchange resin,
the first case includes a first flow entrance in fluid communication with the inlet of the housing to draw in the coolant, and a first flow exit in fluid communication with the outlet of the housing to discharge the coolant, and
the second case includes a second flow entrance in fluid communication with the inlet of the housing to draw in the coolant, and a second flow exit in fluid communication with the outlet of the housing to discharge the coolant.

2. The ion exchanger according to claim 1, wherein
the cartridge includes a pipe that fluidly connects the inlet and the outlet of the housing,
the pipe includes a reduced diameter portion located between the inlet and the outlet,
the first flow entrance of the first case fluidly connects a lower end of the first case and a portion of the pipe located between the inlet and the reduced diameter portion,
the first flow exit of the first case is an inner cavity of a tube member that extends in the first case in a vertical direction,
the tube member is fluidly connected to the pipe at a position between the outlet and the reduced diameter portion,
the second flow entrance of the second case is defined as a space between a wall of the second case and an inner circumferential surface of the housing,
the second flow entrance of the second case fluidly connects a lower end of the second case and a portion of the pipe located between the inlet and the reduced diameter portion, and
the second flow exit of the second case fluidly connects an upper end of the second case and a portion of the pipe located between the outlet and the reduced diameter portion.

3. The ion exchanger according to claim 2, wherein
the wall of the second case includes a larger diameter portion located at an upper side of the second case and a smaller diameter portion located below the larger diameter portion, a boundary between the larger diameter portion and the smaller diameter portion defines a step extending at an angle upwardly toward the inlet of the housing, and the second flow entrance is defined as a space between the smaller diameter portion and the inner circumferential surface of the housing.

4. The ion exchanger according to claim 2, wherein the reduced diameter portion includes a valve mechanism, which performs an opening operation and a closing operation to allow a coolant flow area of the reduced diameter portion to be variable.

5. The ion exchanger according to claim 4, wherein when a flow rate of the coolant flowing through the pipe is less than a predetermined threshold value, the valve mechanism operates to decrease the coolant flow area of the reduced diameter portion compared to when the flow rate is greater than or equal to the threshold value.

6. The ion exchanger according to claim 5, wherein the valve mechanism includes valve members, which elastically deform in accordance with the flow rate of the coolant flowing through the pipe, and when the flow rate of the coolant flowing through the pipe is less than the threshold valve, the valve members elastically deform to decrease the coolant flow area of the reduced diameter portion compared to when the flow rate is greater than or equal to the threshold value.

* * * * *